US008564635B2

(12) United States Patent
Tatsuno et al.

(10) Patent No.: US 8,564,635 B2
(45) Date of Patent: Oct. 22, 2013

(54) OPTICAL SCANNER AND IMAGE FORMING APPARATUS

(75) Inventors: Hibiki Tatsuno, Kanagawa (JP); Nobuyuki Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 283 days.

(21) Appl. No.: 12/868,207

(22) Filed: Aug. 25, 2010

(65) Prior Publication Data

US 2011/0052263 A1    Mar. 3, 2011

(30) Foreign Application Priority Data

Sep. 2, 2009  (JP) ................................. 2009-202218

(51) Int. Cl.
*B41J 15/14*    (2006.01)
*B41J 27/00*    (2006.01)

(52) U.S. Cl.
USPC ........... 347/241; 347/243; 347/256; 347/260; 347/261

(58) Field of Classification Search
USPC .......................... 347/241, 243, 256, 260–261
See application file for complete search history.

(56) References Cited

U.S. PATENT DOCUMENTS

| | | | |
|---|---|---|---|
| 6,856,438 B2 | 2/2005 | Takanashi et al. | |
| 6,924,938 B2 | 8/2005 | Nishina et al. | |
| 7,443,415 B2* | 10/2008 | Kuribayashi | 347/259 |
| 7,626,744 B2 | 12/2009 | Arai et al. | |
| 2004/0183883 A1* | 9/2004 | Suzuki et al. | 347/118 |
| 2007/0127105 A1* | 6/2007 | Igarashi | 359/205 |
| 2008/0219601 A1 | 9/2008 | Arai et al. | |
| 2008/0267662 A1 | 10/2008 | Arai et al. | |
| 2008/0285104 A1 | 11/2008 | Arai et al. | |
| 2009/0096856 A1* | 4/2009 | Kimura | 347/243 |
| 2009/0141316 A1 | 6/2009 | Arai et al. | |
| 2009/0195636 A1 | 8/2009 | Arai et al. | |
| 2009/0314927 A1 | 12/2009 | Tatsuno et al. | |
| 2010/0124434 A1 | 5/2010 | Tatsuno et al. | |

FOREIGN PATENT DOCUMENTS

| | | | |
|---|---|---|---|
| JP | 6-18802 | | 1/1994 |
| JP | 06018802 A | * | 1/1994 |
| JP | 7-209596 | | 8/1995 |
| JP | 10-221625 | | 8/1998 |
| JP | 10-329357 | | 12/1998 |

(Continued)

OTHER PUBLICATIONS

Japanese official action dated Feb. 13, 2013 in corresponding Japanese patent application No. 2009-202218.

*Primary Examiner* — Stephen Meier
*Assistant Examiner* — Sarah Al Hashimi
(74) *Attorney, Agent, or Firm* — Cooper & Dunham LLP

(57) ABSTRACT

An optical scanner includes a light source including light emitters, an aperture member collimating light beams from the light source, a deflector deflecting the light beams passing through the aperture member, and a scanning optical system condensing the deflected light beams onto a scanned surface to optically scan the surface in a main-scanning direction. The scanning optical system includes a resin scanning system having at least one resin scanning lens. At least one folding mirror/sheet glass is disposed between a scanning lens nearest to the deflector in the resin scanning system and the scanned surface. At least one scanning lens in the resin scanning system has an uneven birefringence distribution with respect to a sub-scanning direction. An optical conjugate image of the aperture member is formed between a lens surface nearest to the deflector in the resin scanning system and a lens surface nearest to the scanned surface with respect to the sub-scanning direction.

13 Claims, 12 Drawing Sheets

(56) References Cited

FOREIGN PATENT DOCUMENTS

| JP | 11-109269 | 4/1999 |
|---|---|---|
| JP | 3060327 | 4/2000 |
| JP | 2002-23083 | 1/2002 |
| JP | 3518765 | 2/2004 |
| JP | 2007-147864 | 6/2007 |
| JP | 2009-3393 | 1/2009 |

* cited by examiner

POSITION WHERE OPTICAL CONJUGATE IMAGE OF APERTURE PLATE 16 IS FORMED

FIG. 12

| INCIDENT ANGLE OF LIGHT [DEGREES] | | 0 | 10 | 20 | 30 | 45 |
|---|---|---|---|---|---|---|
| REFLECTANCE [%] | S POLARIZED LIGHT | 86.7 | 86.9 | 87.5 | 88.4 | 90.5 |
| | P POLARIZED LIGHT | 86.7 | 86.5 | 85.9 | 84.8 | 81.8 |
| | AVERAGE | 86.7 | 86.7 | 86.7 | 86.6 | 86.2 |

FIG. 13

| INCIDENT ANGLE OF LIGHT [DEGREES] | | 0 | 10 | 20 | 30 | 45 |
|---|---|---|---|---|---|---|
| REFLECTANCE [%] | S POLARIZED LIGHT | 86.7 | 87.0 | 87.7 | 88.6 | 90.3 |
| | P POLARIZED LIGHT | 86.7 | 86.6 | 86.1 | 85.1 | 81.9 |
| | AVERAGE | 86.7 | 86.8 | 86.9 | 86.9 | 86.1 |

POSITION WHERE OPTICAL CONJUGATE IMAGE OF APERTURE PLATE 16 IS FORMED

MAIN SCANNING DIRECTION

OPTICAL SCANNER AND IMAGE FORMING APPARATUS

CROSS-REFERENCE TO RELATED APPLICATIONS

The present application claims priority to and incorporates by reference the entire contents of Japanese Patent Application No. 2009-202218 filed in Japan on Sep. 2, 2009.

BACKGROUND OF THE INVENTION

1. Field of the Invention

The present invention relates to an optical scanner and an image forming apparatus, and more particularly to an optical scanner that scans a surface to be scanned with a light beam and to an image forming apparatus including the optical scanner.

2. Description of the Related Art

In a digital copier, a laser printer, a laser facsimile, and the like, an image is written using an optical scanner. Such an optical scanner includes a light source having a light emitter, a first optical system that forms an image of a light beam output from the light source as a long linear image extending in a main-scanning direction, a deflector having a deflecting reflective surface disposed near a position where the linear image is formed to deflect a light beam output from the first optical system, and a second optical system that condenses a light beam deflected by the deflector to a spot of light on a surface to be scanned, so that the surface is scanned with the light beam. A so-called multi-beam optical scanner in which a surface to be scanned is scanned with a plurality of light beams by using a multi-beam light source having a plurality of light emitters is also well known.

An increasing number of molded plastic products have come to be used for optical elements in the optical scanner, especially as a lens (scanning lens) used in the second optical system because the molded plastic products are economical and a free form surface can be achieved relatively easily. A molded plastic scanning lens is also positively adopted in the multi-beam optical scanner, in the same manner as in the conventional optical scanner having a single-beam light source.

In a molded plastic scanning lens, the refractive index distribution tends to be uneven.

To address this issue, Japanese Patent No. 3518765, for example, discloses a multi-beam optical scanner including a multi-beam light source, a first optical system that forms images of a plurality of light beams output from the light source as a plurality of long linear images extending in the main-scanning direction, an optical deflector that deflects the light beams, and a second optical system that condenses deflected light beams onto a surface to be scanned. The second optical system includes an optical element having an uneven refractive index distribution, and having a certain relationship between the number of multiple incident light beams, a pitch of chief rays of the multiple beams on a plane of incidence in a sub-scanning direction, the refractive index distribution, and an effective range of the lens corresponding to the effective write width on the surface to be scanned in the sub-scanning direction.

Furthermore, Japanese Patent Application Laid-open No. 2009-3393 discloses an optical scanner including, in the following order, a light source having a plurality of light emitters capable of performing independent optical modulation and arranged in a sub-scanning direction; an optical coupling element that converts a light beam output from each of the light emitters into a bundle of substantially parallel rays; an aperture for defining an outer edge of the parallel ray bundle; a collimating optical element that collimates the parallel ray bundle along the sub-scanning direction; a deflecting element that deflectively scans the ray bundle thus collimated; and a scanning optical system that forms images of the deflectively scanned ray bundle to scan a surface to be scanned. The scanning optical system has a plurality of lenses including resin lenses with positive power in the sub-scanning direction. The aperture and the resin lens are in optically conjugate relationship in the sub-scanning direction.

During a plastic molding process of an optical element, birefringence appears in a lens depending on its material, production conditions, its form, and other factors. Birefringence is a phenomenon where the refractive index becomes different for rays of light in directions perpendicular to each other, and is expressed by a main axis orientation and a phase difference. The main axis orientation herein has the same meaning as a fast axis orientation or a slow axis orientation.

Many scanning lenses are larger in size than pickup lenses (objective lenses), for example, used in an optical disk apparatus, and some molded plastic scanning lenses have an uneven birefringence distribution. In particular, a larger difference in thickness between the center and the peripherals of a lens, that is, a greater difference in thickness leads to more uneven birefringence distribution.

For example, it is assumed herein that, as illustrated in FIG. 25, two light beams (a beam 1 and a beam 2) output from different light emitters (ch1 and ch2) and separated from each other in the sub-scanning direction, pass through a scanning lens having a birefringence distribution illustrated in FIGS. 24A to 24C. In such a system, the birefringence of the scanning lens affects the beam 1 and the beam 2 differently. Therefore, as in an example illustrated in FIG. 26, the beam 1 and the beam 2, both of which are polarized linearly before being incident on the scanning lens, are polarized in a different manner after passing through the scanning lens. In FIG. 26, the beam 1 is elliptically polarized in a vertically elongated manner, and the beam 2 is elliptically polarized in a horizontally elongated manner. If a folding mirror is disposed between the scanning lens and the scanned surface, for example, because the reflectance of the beam 1 and that of the beam 2 are different on the folding mirror, the amounts of light on the scanned surface become different between ch1 and ch2. If the amounts of light on the scanned surface are different depending on the light emitters, the concentration of an output image might become uneven, and especially, banding might occur.

Furthermore, in a vertical cavity surface emitting laser array having a plurality of light emitters each outputting linearly polarized light, the direction of the polarity is rotated depending on the strength of the oscillation of the laser. The degree of the rotation differs in each of the light emitters (for example, see the paragraph [0003] in Japanese Patent Application Laid-open No. 2007-147864). If a vertical cavity surface emitting laser array having the light emitters outputting light with different polarization angles is affected by an uneven birefringence distribution, the difference in the amounts of light on the scanned surface is further increased, and the concentration of the output image would be more uneven, or banding would be more prominent.

Effects of an uneven refractive index distribution and an uneven birefringence distribution will now be explained. If a refractive index distribution is uneven, because the refractive power becomes different depending on a beam path, the light emitters have different focal points on the scanned surface, disadvantageously. This occurs only within a refractive optical system having a multi-beam light source and a scanning lens having an uneven refractive index distribution.

If the birefringence distribution is uneven, because the degree of birefringence becomes different depending on a beam path, the reflectance of the folding mirror and the transmittance of a dust preventing sheet glass, both of which are disposed between the molded plastic scanning lens and the scanned surface, become different for each of the beams. As a result, the amount of exposure on the scanned surface would be different for each of the light emitters, disadvantageously. This is caused by a multi-beam light source, a scanning lens having such an uneven birefringence distribution, and optical components (an optical reflecting member or an optical transmitting member) disposed between the scanning lens having an uneven birefringence distribution and the scanned surface. Such a system causes no difference in the amount of light on the scanned surface if no optical components are disposed between the scanning lens having an uneven birefringence distribution and the scanned surface.

In this manner, the effect of the uneven birefringence distribution differs from the effect of the uneven refractive index distribution.

SUMMARY OF THE INVENTION

It is an object of the present invention to at least partially solve the problems in the conventional technology.

According to one aspect of the present invention, an optical scanner includes a light source including a plurality of light emitters, an aperture member that collimates light beams output from the light source and coupled, a deflector that defects the light beams passing through the aperture member, and a scanning optical system that condenses the light beams deflected on the deflector onto a surface to be scanned so as to optically scan the surface in a main-scanning direction, wherein the scanning optical system includes a resin scanning system having at least one resin scanning lens, at least one folding mirror or one sheet glass is disposed between a scanning lens nearest to the deflector in the resin scanning system and the scanned surface, at least one scanning lens included in the resin scanning system has an uneven birefringence distribution with respect to a sub-scanning direction perpendicular to the main-scanning direction, and an optical conjugate image of the aperture member is formed between a lens surface nearest to the deflector in the resin scanning system and a lens surface nearest to the scanned surface with respect to the sub-scanning direction.

According to another aspect of the present invention, an image forming apparatus includes at least one image carrying body, and at least one optical scanner that scans the image carrying body by using a light beam including image information. The optical scanner includes a light source including a plurality of light emitters, an aperture member that collimates light beams output from the light source and coupled, a deflector that defects the light beams passing through the aperture member, and a scanning optical system that condenses the light beams deflected on the deflector onto a surface to be scanned so as to optically scan the surface in a main-scanning direction, wherein the scanning optical system includes a resin scanning system having at least one resin scanning lens, at least one folding mirror or one sheet glass is disposed between a scanning lens nearest to the deflector in the resin scanning system and the scanned surface, at least one scanning lens included in the resin scanning system has an uneven birefringence distribution with respect to a sub-scanning direction perpendicular to the main-scanning direction, and an optical conjugate image of the aperture member is formed between a lens surface nearest to the deflector in the resin scanning system and a lens surface nearest to the scanned surface with respect to the sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a schematic for explaining a relationship between an incident angle and a reflectance on a folding mirror;

FIG. 13 is a schematic for explaining the relationship between the incident angle and the reflectance when the folding mirror illustrated in FIG. 12 is coated with $SiO_2$;

DETAILED DESCRIPTION OF THE PREFERRED EMBODIMENTS

Figure 1:
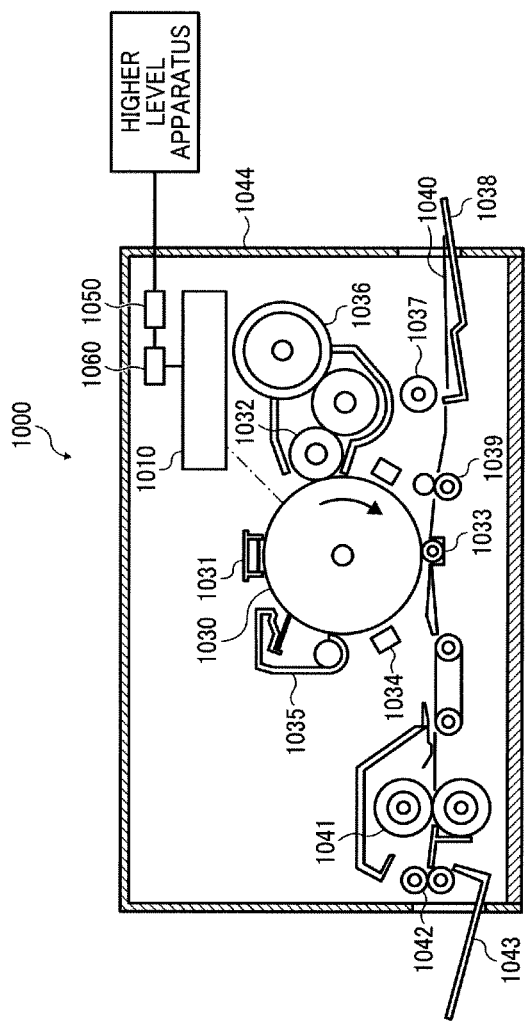
FIG. 1 is a schematic for explaining a general configuration of a laser printer according to an embodiment of the present invention.

Exemplary embodiments of the present invention are explained below with reference to FIGS. 1 to 22. FIG. 1 is a schematic of a laser printer 1000 as an image forming apparatus according to an embodiment of the present invention.

The laser printer 1000 includes an optical scanner 1010, a photosensitive drum 1030, a charger 1031, a developing roller 1032, a transfer charger 1033, a neutralizing unit 1034, a cleaning unit 1035, a toner cartridge 1036, a paper feeding roller 1037, a paper feeding tray 1038, a registration roller pair 1039, a fixing rollers 1041, paper ejecting rollers 1042, a paper ejecting tray 1043, a communication controller 1050, and a printer controller 1060 that controls each of these units comprehensively. These units are housed in predetermined positions in a printer housing 1044.

The communication controller 1050 controls bidirectional communications with a higher level apparatus (e.g., a personal computer) via a network, for example.

The photosensitive drum 1030 is a cylindrical member, and a photosensitive layer is formed on its surface. In other words, the surface of the photosensitive drum 1030 is a surface to be scanned. The photosensitive drum 1030 is rotated in the direction pointed by the arrow in FIG. 1.

The charger 1031, the developing roller 1032, the transfer charger 1033, the neutralizing unit 1034, and the cleaning unit 1035 are arranged near the surface of the photosensitive drum 1030, and arranged sequentially in the order of the charger 1031, the developing roller 1032, the transfer charger 1033, the neutralizing unit 1034, and the cleaning unit 1035 in the rotating direction of the photosensitive drum 1030.

The charger 1031 charges the surface of the photosensitive drum 1030 uniformly.

The optical scanner 1010 irradiates the surface of the photosensitive drum 1030 charged by the charger 1031 with a light beam modulated based on image information received from the higher level apparatus. In this manner, a latent image corresponding to the image information is formed on the surface of the photosensitive drum 1030. The latent image thus formed is carried to the developing roller 1032 by rotation of the photosensitive drum 1030. A structure of the optical scanner 1010 will be explained later.

The toner cartridge 1036 stores therein a toner, and the toner is supplied to the developing roller 1032.

The developing roller 1032 attaches the toner supplied from the toner cartridge 1036 to the latent image formed on the surface of the photosensitive drum 1030 to visualize the image information. The latent image to which the toner is attached (also referred to as "toner image" hereinafter for convenience) is carried to the transfer charger 1033 by rotation of the photosensitive drum 1030.

Recording paper 1040 is stored in the paper feeding tray 1038. The paper feeding roller 1037 is disposed near the paper feeding tray 1038 to take out the recording paper 1040 one sheet at a time from the paper feeding tray 1038, and to convey the recording paper 1040 into the registration roller pair 1039. The registration roller pair 1039 temporarily maintains the recording paper 1040 taken out by the paper feeding roller 1037, and feeds the recording paper 1040 into the space between the photosensitive drum 1030 and the transfer charger 1033 in synchronization with rotation of the photosensitive drum 1030.

A voltage having an opposite polarity to the toner is applied to the transfer charger 1033 so that the toner attached to the surface of the photosensitive drum 1030 is electrically attracted to the recording paper 1040. By way of these voltages, the toner image on the surface of the photosensitive drum 1030 is transferred onto the recording paper 1040. The recording paper 1040 transferred with the toner image is sent to the fixing rollers 1041.

The fixing rollers 1041 apply heat and pressure to the recording paper 1040. In this manner, the toner is fixed to the recording paper 1040. The recording paper 1040 to which the toner is fixed is sent to the paper ejecting tray 1043 via the paper ejecting rollers 1042, and sequentially stacked in the paper ejecting tray 1043.

The neutralizing unit 1034 neutralizes the surface of the photosensitive drum 1030.

The cleaning unit 1035 removes the toner remaining on the surface of the photosensitive drum 1030 (residual toner). The surface of the photosensitive drum 1030 where the residual toner is removed returns to a position facing the charger 1031.

A structure of the optical scanner 1010 will now be explained.

Figure 2:
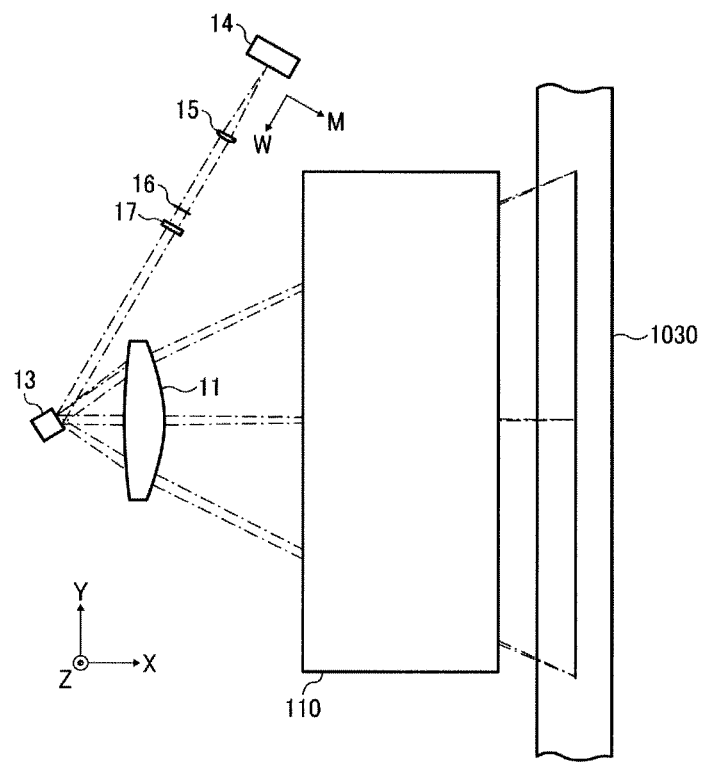
FIG. 2 is a schematic for explaining the optical scanner illustrated in FIG. 1.

As illustrated in FIG. 2, an example of the optical scanner 1010 includes a scanning lens 11, a polygon mirror 13, a light source 14, a coupling lens 15, an aperture plate 16, a cylindrical lens 17, an image-plane-side optical system 110, and a scanning controller (not illustrated). These units are assembled in predetermined positions in an optical housing (not illustrated).

Hereinafter, a direction in the longitudinal direction of the photosensitive drum 1030 is explained as a Y axis direction, and the direction of the optical axis of the scanning lens 11 is explained to be an X axis direction in a three dimensional X-Y-Z Cartesian coordinate system. The direction of a light beam travelling from the light source 14 to the polygon mirror 13 is referred to as a "W direction" hereinafter for convenience. The direction perpendicular to a Z axis and the W direction is defined as an M direction.

Furthermore, also for a convenience, a direction corresponding to a main-scanning direction is simply referred to as a "main-scanning corresponding direction", and a direction corresponding to a sub-scanning direction is simply referred to as "sub-scanning corresponding direction".

Figure 3:
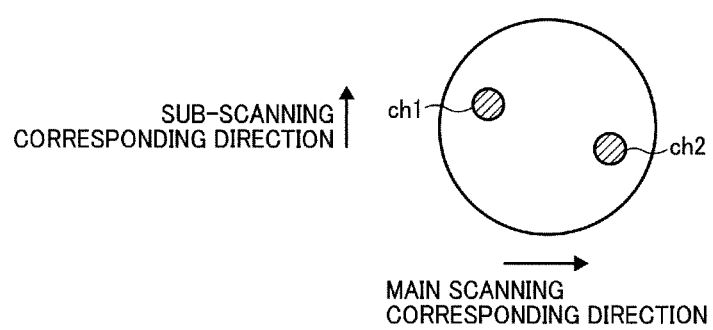
FIG. 3 is a schematic for explaining a surface emitting laser array included in the light source illustrated in FIG. 2.

An example of the light source 14 illustrated in FIG. 3 includes two light emitters (ch1 and ch2) that are positioned offset from each other in the main-scanning corresponding direction and the sub-scanning corresponding direction. The main-scanning corresponding direction of the light source 14 is in the M direction, and the sub-scanning corresponding direction is in the Z axis direction. The light source 14 also includes a driving apparatus for driving each of the light emitters (causing each of the light emitters to emit light) individually. In other words, the photosensitive drum 1030 can be scanned by two light beams simultaneously.

Each of the light emitters is a vertical cavity surface emitting laser having an oscillation wavelength in a 780 nanometer band. The distance between the centers of the two light emitters is 20 micrometers.

The light beam output from each of the light emitters is a linearly polarized light, oscillating in a direction perpendicular to the X-Y plane.

Referring back to FIG. 2, the coupling lens 15 is arranged on the light paths of the light beams emitted from the light source 14, to convert the light beams into bundles of approximate parallel rays. The focal distance of the coupling lens 15 is 15 millimeters for the light beam having a wavelength of 780 nanometers.

The aperture plate 16 has an aperture to collimate the light beams traveled through the coupling lens 15.

The cylindrical lens 17 has large power in the sub-scanning corresponding direction (that is the same as the Z axis direction in this example), and forms images of the light beams, traveled through the aperture of the aperture plate 16, with respect to the sub-scanning corresponding direction at a position near a deflecting reflective surface of the polygon mirror 13. The focal distance of the cylindrical lens 17 is 30 millimeters on the W-Z plane.

An optical system disposed on the light paths between the light source 14 and the polygon mirror 13 are sometimes referred to as a pre-deflector optical system. In this embodiment, the pre-deflector optical system includes the coupling lens 15, the aperture plate 16, and the cylindrical lens 17.

The polygon mirror 13 is a four-faced mirror having an inscribing circle with a radius of 10 millimeters, and each face acting as a deflecting reflective surface. The polygon mirror 13 is rotated about an axis in parallel with the Z axis direction at a constant speed, to deflect the incident light beams from the cylindrical lens 17. On the X-Y plane, the angle formed by a direction of the light beams incoming from the cylindrical lens 17 and the optical axis of the scanning lens 11 is 60 degrees.

The scanning lens 11 is a molded plastic scanning lens, and disposed on the light paths of the light beams deflected on the polygon mirror 13. The scanning lens 11 has a refractive index of 1.517 for a d-ray, and an Abbe's number of 64.2. The thickness of the center of the scanning lens 11 is 30 millimeters.

The X-Y cross section of a first surface of the scanning lens 11 (the surface facing –X direction) has a curvature radius of –200 millimeters, and the X-Z cross section of the first surface of the scanning lens 11 has a curvature radius of –23 millimeters.

The X-Y cross section of a second surface of the scanning lens 11 (the surface facing +X direction) has curvature radius of 100 millimeters, and the X-Z cross section of the second surface of the scanning lens 11 is flat.

The distance (the length of the light path) between the aperture plate 16 and the first surface of the cylindrical lens 17 is 43 millimeters.

The distance (the length of the light path) between a second surface of the cylindrical lens 17 and the deflecting reflective surface of the polygon mirror 13 is 30 millimeters.

The distance (the length of the light path) between the deflecting reflective surface of the polygon mirror 13 and the first surface of the scanning lens 11 is 70 millimeters.

The distance (the length of the light path) between the deflecting reflective surface of the polygon mirror 13 and the surface of the photosensitive drum 1030 is 185 millimeters.

The image-plane-side optical system 110 is arranged between the scanning lens 11 and the photosensitive drum 1030.

An optical system arranged on the light paths between the polygon mirror 13 and the photosensitive drum 1030 is referred to as a scanning optical system. In this embodiment, the scanning optical system includes the scanning lens 11 and the image-plane-side optical system 110.

Various configurations of the image-plane-side optical system 110 are possible.

Figure 4:
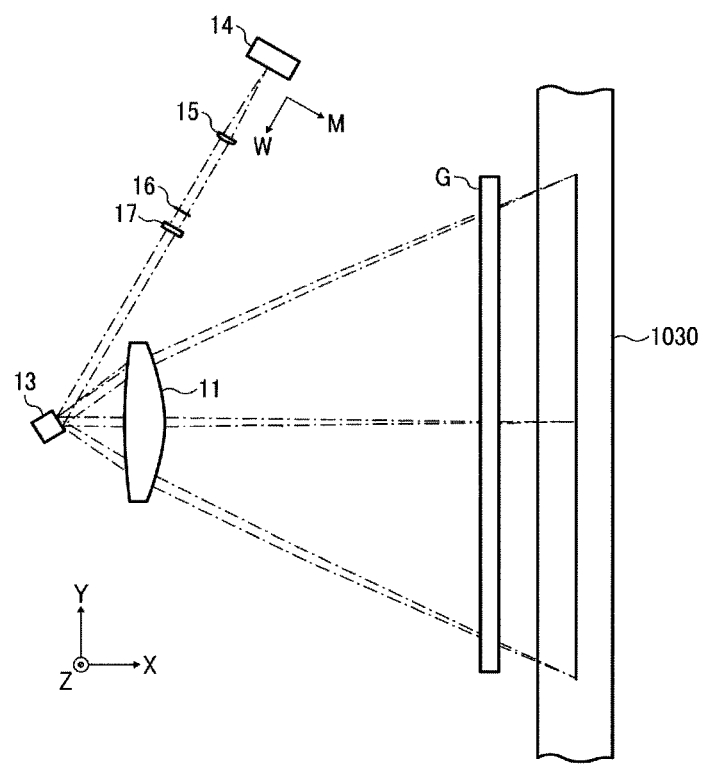
FIG. 4 is a first schematic for explaining a first exemplary configuration of the image-plane side optical system illustrated in FIG. 2.
Figure 5:
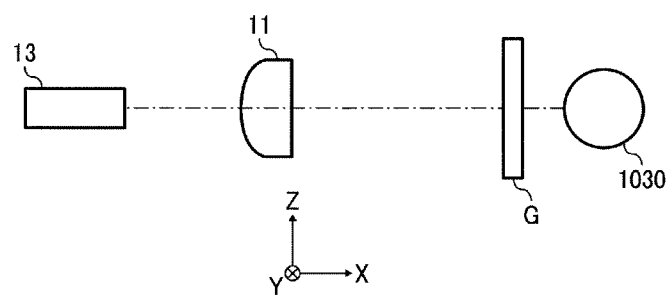
FIG. 5 is a second schematic for explaining the first exemplary configuration of the image-plane side optical system illustrated in FIG. 2.

In a first exemplary configuration, the image-plane-side optical system 110 is formed as a single sheet glass G as illustrated in FIGS. 4 and 5.

The sheet glass G has a refractive index of 1.517 for a d-ray, and an Abbe's number of 64.2. The thickness of the sheet glass G is 10 millimeters.

The distance (the length of the light path) between the deflecting reflective surface of the polygon mirror 13 and a first surface of the sheet glass G is 150 millimeters.

Figure 6:
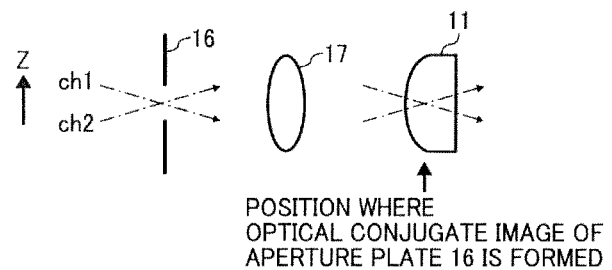
FIG. 6 is a schematic for explaining an optical conjugate image of an aperture plate in the first exemplary configuration.

In this exemplary configuration, an optical conjugate image of the aperture plate 16 is formed near the first surface of the scanning lens 11 as illustrated in FIG. 6.

The lateral magnification of the optical conjugate image of the aperture plate 16 is less than one.

Figure 7:
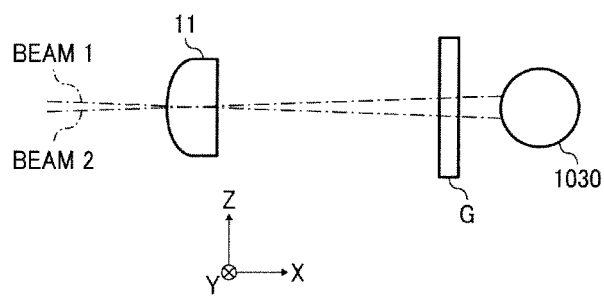
FIG. 7 is a schematic for explaining light paths of chief rays of two scanning light beams in the first exemplary configuration.

Thus, as illustrated in FIG. 7, the chief ray of the light beam (beam 1) emitted from the light emitter ch1 crosses the chief ray of the light beam (beam 2) emitted from the light emitter ch2 near the first surface of the scanning lens 11.

In this case, because each of the light beams (the beam 1 and the beam 2) passes through the scanning lens 11 at almost the same position, the effects of birefringence introduced thereto are also almost the same.

Thus, the transmittance of the beam 1 and the transmittance of the beam 2 in the sheet glass G become also almost the same. As a result, the light amounts of the beam 1 and the beam 2 on the photosensitive drum 1030 also become almost the same.

Figure 8:
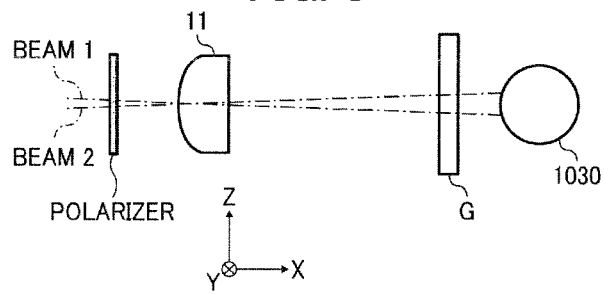
FIG. 8 is a schematic for explaining a polarizer disposed immediately before a scanning lens in the first exemplary configuration.

In this situation, the light amount difference attributable to a slight difference remaining in the birefringence is expressed by the formula (1) below. In this formula, it is assumed that a polarizer passing only a linearly polarized light component oscillating perpendicularly to the X-Y plane is placed immediately before the scanning lens 11, as illustrated in FIG. 8 for example, the light amounts of the beam 1 and the beam 2 output from the polarizer are respectively denoted as in1 and in2, the light amounts of the beam 1 and the beam 2 on the photosensitive drum 1030 are respectively denoted as I1 and I2:

$$I1/IN1 - I2/in2 \neq 0 \tag{1}$$

Figure 9:
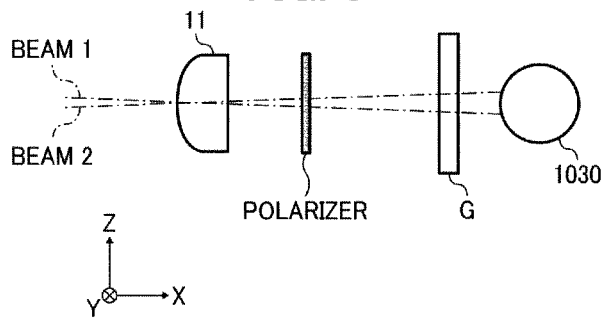
FIG. 9 is a schematic for explaining a polarizer disposed immediately behind the scanning lens in the first exemplary configuration.

As another example illustrated in FIG. 9, assuming that the polarizer is placed immediately behind the scanning lens 11, the following formula (2) is established, when the light amounts of the beam 1 and the beam 2 output from the polarizer are respectively denoted as in1' and in2', and the light amounts of the beam 1 and the beam 2 on the photosensitive drum 1030 are respectively denoted as I1' and I2':

$$I1'/in1 - I2'/in2' \approx 0 \tag{2}$$

Assuming that the polarizer is placed immediately before the scanning lens 11, the following formula (3) is established, using an extinction ratio Er1 of the beam 1 and an extinction ratio Er2 of the beam 2 on the photosensitive drum 1030:

$$Er1 \neq Er2 \tag{3}$$

Assuming that the polarizer is placed immediately behind the scanning lens 11, the following formula (4) is established, using an extinction ratio Er1' of the beam 1 and an extinction ratio Er2' of the beam 2 on the photosensitive drum 1030:

$$Er1'=Er2' \quad (4)$$

The extinction ratio is a ratio between a polarized component of an optical energy on the photosensitive drum 1030 oscillating in a direction perpendicular to the main-scanning direction (S polarized component) and a polarized component oscillating in a direction in parallel with the main-scanning direction (P polarized component), and expressed by the following formula (5):

Extinction Ratio=(Amount of Light on Photosensitive Drum 1030 Attributable to S Polarized Component)/(Amount of Light on Photosensitive Drum 1030 Attributable to P Polarized Component)    (5)

Figure 10:
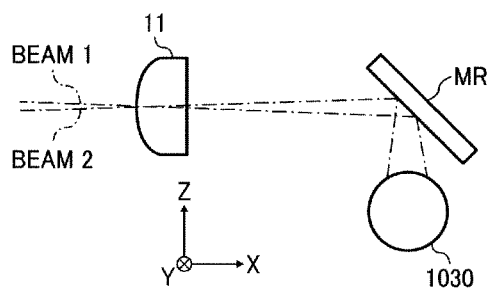
FIG. 10 is a schematic for explaining a second exemplary configuration of the image-plane side optical system illustrated in FIG. 2.

In a second exemplary configuration, as illustrated in FIG. 10, a single sheet of a folding mirror MR is used instead of the sheet glass G used in the first exemplary configuration.

The distance (the length of the light path) between the deflecting reflective surface of the polygon mirror 13 and the reflective surface of the folding mirror MR is almost the same as the distance (the length of the light path) between the deflecting reflective surface of the polygon mirror 13 and the first surface of the sheet glass G according to the first exemplary configuration.

In this configuration too, because each of the light beams (the beam 1 and the beam 2) passes through the scanning lens 11 at almost the same position, the effect of birefringence introduced thereto is also almost the same as well.

Therefore, the reflectance of the beam 1 on the folding mirror MR becomes almost the same as the reflectance of the beam 2 on the folding mirror MR. As a result, the light amounts of the beam 1 and the beam 2 on the photosensitive drum 1030 become almost the same.

In a third exemplary configuration, the image-plane-side optical system 110 includes a single sheet of the folding mirror MR in the same manner as in the second exemplary configuration.

However, the position of the cylindrical lens 17 is shifted toward the aperture plate 16 by a length of 15 millimeters, in comparison with the second exemplary configuration. Furthermore, the first surface of the scanning lens 11 (the surface toward −X) has a curvature radius of −25 millimeters across the X-Z cross section, unlike the second exemplary configuration.

Figure 11:
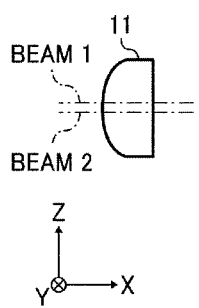
FIG. 11 is a schematic for explaining a third exemplary configuration of the image-plane side optical system illustrated in FIG. 2.

In this configuration, as illustrated in FIG. 11 as an example, the chief ray of the light beam (beam 1) output from the light emitter ch1 does not cross the chief ray of the light beam (beam 2) output from the light emitter ch2 near the first surface of the scanning lens 11.

For example, if the birefringence is "main axis 0 degree (Z axis direction) and the phase difference 0" at a part of the scanning lens 11 where the chief ray of the beam 1 passes through, and if the birefringence is "main axis 45 degrees and the phase difference ¼λ" at a part of the scanning lens 11 where the chief ray of the beam 2 passes through, the beam 1 after passing through the scanning lens 11 would be S-polarized, and the beam 2 would be circularly polarized. Herein, λ denotes the wavelength of the beam 1 and the beam 2 (780 nanometers each in this example).

When the folding mirror MR is a plate-like member having a refractive index of 1.62, and having vapor-deposited aluminum in a thickness of 10λ, the relationship between the incident light angle and the reflectance would be as illustrated in FIG. 12. Herein, λ is 780 nanometers. According to FIG. 12, the reflectance of the beam 1 is 90.5 percent at the incident angle of 45 degrees, and the reflectance of the beam 2 is 86.2 percent. At the position of an image height 0 on the photosensitive drum 1030, for example, a light amount difference of 4.3 percent would occur between the beam 1 and the beam 2, and it might result in banding.

Such banding can be alleviated slightly by providing a coating on the reflective surface of the folding mirror MR. This effect can be achieved just by applying a single layer of $SiO_2$ on the reflective surface of the folding mirror MR, for example. A relationship between the incident light angle and the reflectance under such a condition is illustrated in FIG. 13. According to FIG. 13, the reflectance of the beam 1 is 90.3 percent and the reflectance of the beam 2 is 86.1 percent at an incident angle of 45 degrees, for example, and a light amount difference is reduced to 4.2 percent between the beam 1 and the beam 2 at the position of an image height 0 on the photosensitive drum 1030, for example.

If the light amount difference increases up to 4.3 percent, such light amount difference can be detected within a measurement accuracy of a generally available light amount meter (power meter). However, if the light amount difference is 2 percent, for example, because the measurement error of a power meter is generally approximately 2 percent, it is difficult to determine whether a light amount difference of 2 percent is present between the beams, in other words, whether a scanning lens has uneven birefringence distribution based on the light amounts. Therefore, in the formula (2) mentioned above, the symbol ≈ is used to indicate that the difference between the right hand side and the left hand side of the formula is equal to or less than 2 percent.

However, when banding appears on an output image despite that it is not detected by light amount measurements, it is preferable to measure the birefringence distribution of a scanning lens directly. A method of measuring a birefringence distribution is disclosed in Japanese Patent Application Laid-open No. 2007-147864 and Japanese Patent No. 3518765, for example.

Figure 14:
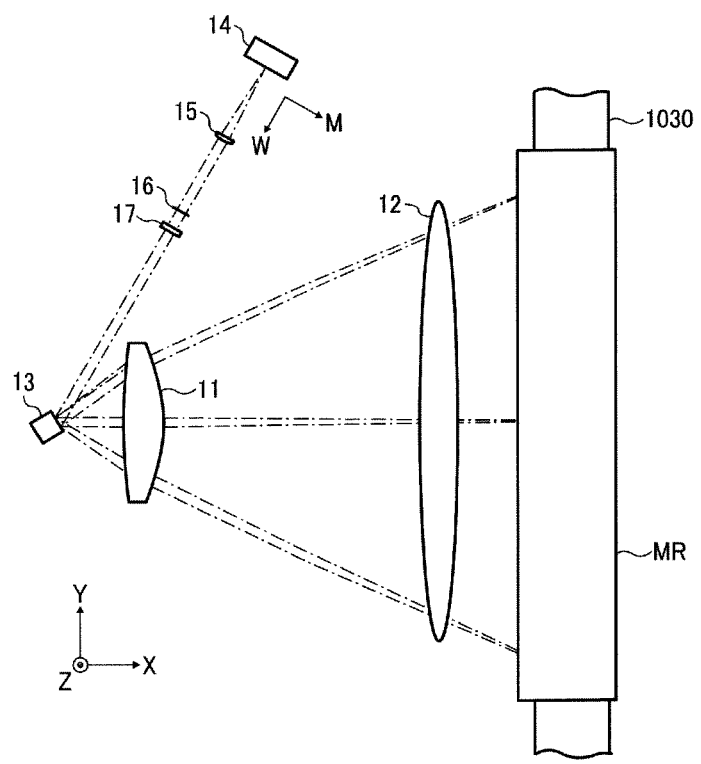
FIG. 14 is a schematic for explaining a fourth exemplary configuration of the image-plane side optical system illustrated in FIG. 2.

In a fourth exemplary configuration, the image-plane-side optical system 110 includes a molded plastic scanning lens 12 and a single sheet of the folding mirror MR, as illustrated in the example in FIG. 14.

Figure 15:
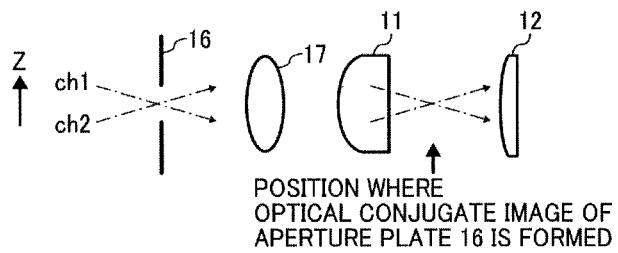
FIG. 15 is a schematic for explaining an optical conjugate image of the aperture plate in the fourth exemplary configuration.

In this configuration, as an example illustrated in FIG. 15, the optical conjugate image of the aperture plate 16 is formed between the scanning lens 11 and the scanning lens 12. In this manner, the first beam and the second beam can pass through each of these scanning lenses at nearby positions. Therefore, each of the light beams (the beam 1 and the beam 2) is affected by the birefringence by approximately the same degree in each of the scanning lenses.

Thus, the reflectance of the beam 1 and the reflectance of the beam 2 on the folding mirror MR become almost the same. As a result, the light amounts of the beam 1 and the beam 2 on the photosensitive drum 1030 become almost the same.

Furthermore, if a polarizer passing only the linearly polarized light components oscillating in perpendicular to the X-Y plane is placed immediately before the scanning lens 12, the formulas (1) and (3) are established. If the polarizer is placed immediately behind the scanning lens 12, the formulas (2) and (4) are established.

Figure 16:
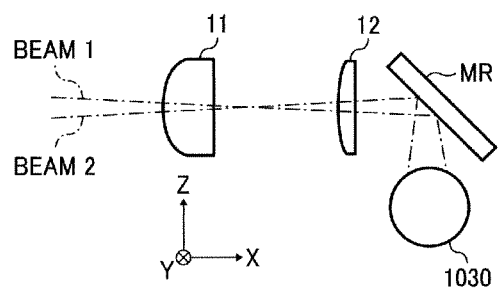
FIG. 16 is a schematic for explaining light paths of the chief rays of the two scanning light beams in the fourth exemplary configuration.

The larger the thickness difference within a scanning lens is, more uneven the birefringence distribution becomes. Therefore, as illustrated in FIG. 16 as an example, it is preferable to allow the optical conjugate image of the aperture plate 16 to be formed near the scanning lens 11 whose thickness difference between the center and the peripheral is rather large. The degree of the birefringence in each of the scanning lenses alone can be measured in the methods mentioned above.

It can be determined whether the entire scanning optical system is affected by the birefringence based on whether the formulas (1) to (4) are established. In particular, if it can be determined that any one of the formulas (1) to (4) is established by means of measurements, it can be determined whether the optical system including the molded plastic scanning lens and therebehind are affected by the birefringence. In this manner, the problem can be isolated to the birefringence of the molded plastic scanning lens.

Figure 17:
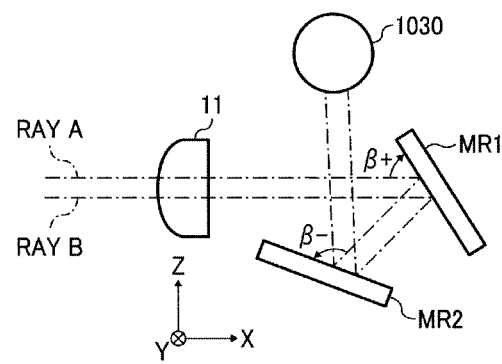
FIG. 17 is a schematic for explaining a fifth exemplary configuration of the image-plane side optical system illustrated in FIG. 2.

In a fifth exemplary configuration, the image-plane-side optical system 110 includes two sheets of folding mirrors (MR1 and MR2), as illustrated in FIG. 17 as an example.

A folding mirror MR1 is disposed on the light path of the light beam that has passed through the scanning lens 11, and is inclined in the X axis direction on the X-Z plane. A folding mirror MR2 is disposed on the light path of the light beam reflected on the folding mirror MR1, and is inclined in the X-axis direction on the X-Z plane.

Out of two rays included in the beam 1 output from the light emitter ch1 and being separated from each other in the Z axis direction, the +Z side ray is denoted as a ray A, and the −Z side ray is denoted as a ray B, for example, as illustrated in FIG. 17.

For convenience, in the light path from the polygon mirror 13 to the photosensitive drum 1030 on the X-Z plane, a folding mirror having a reflective surface to which the ray A is incident on a position nearer to the polygon mirror 13 than the position the ray B is defined as a folding mirror with a "β+" inclination angle property, and a folding mirror with an opposite property is defined as a folding mirror with "β−" inclination angle property.

The ray A and the ray B are deflected on the polygon mirror 13, and pass through the scanning lens 11 together, and are incident on the folding mirror MR1. At this time, because the folding mirror MR1 has a "β+" inclination angle property, the ray A is reflected earlier in time than the ray B. In other words, if the inclination angle is acute with respect to the ray, the inclination angle property can be said to be "β+", and, if the angle of inclination is obtuse with respect to the ray, the inclination angle property can be said to be "β−".

The ray A and the ray B reflected on the folding mirror MR1 are incident on the folding mirror MR2. The folding mirror MR2 has a "β−" inclination angle property.

In such a configuration, for a light beam travelling to peripheral image heights, a reflectance change introduced by a change in the polarization state at uneven birefringence distribution of the scanning lens 11 would be reverse on the folding mirror MR2 from that on the folding mirror MR1. In this manner, the changes in the amount of light on the photosensitive drum 1030 can be cancelled out.

Figure 18:
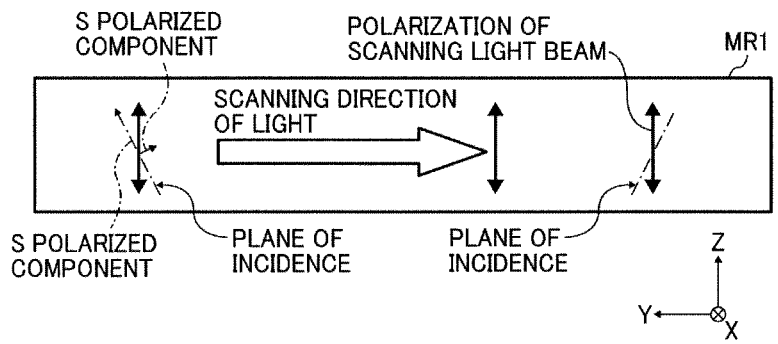
FIG. 18 is a first schematic for explaining a relationship between a position where the scanning light beams enters the folding mirror and the planes of incidence.

More specifically, the light output from the light source 14 is a linearly polarized light oscillating in a direction perpendicular to the X-Y plane, the scanning light beams incident on the folding mirror MR1 would be polarized in parallel with the Z axis, as illustrated in FIG. 18. On the contrary, the plane of incidence (a plane including both of the incident light and the reflected light) of the rays incident on the folding mirror MR1 is inclined by different degrees depending on a position at which the rays are incident thereon.

The light reflectance at a position of incidence on the folding mirror MR1 can be calculated by separating the linearly polarized light oscillating in parallel with the Z axis into a S polarized component and a P polarized component at an +Y end thereof, by referring to FIG. 12 and adding the reflectance of the S polarized light and that of the P polarized light in their component ratio.

Figure 19:
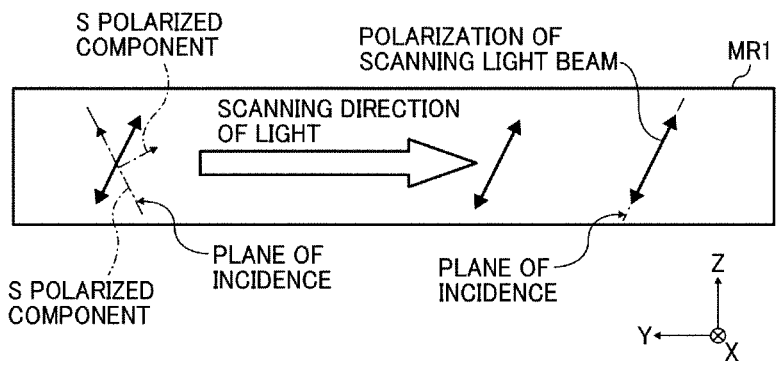
FIG. 19 is a second schematic for explaining the relationship between a position where the scanning light beams enters the folding mirror and the planes of incidence.

If the polarizations of the scanning light beams are changed by the effect of the birefringence of the scanning lens 11, e.g., the linearly polarized light is rotated, the component ratio between the S polarized component and the P polarized component also change, as illustrated in FIG. 19 as an example. Therefore, the reflectance would change as well, in comparison with the situation illustrated in FIG. 18.

Figure 20:
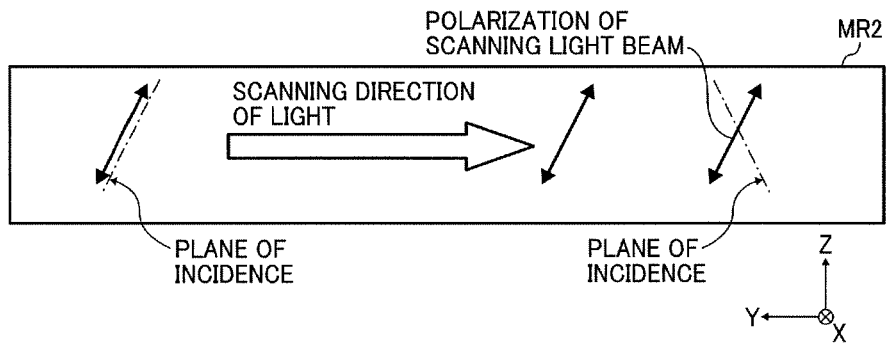
FIG. 20 is a third schematic for explaining the relationship a position where the scanning light beams enters the folding mirror and the planes of incidence.

On the contrary, in the folding mirror MR2 having a "β−" inclination angle property, the relationship between a position on which the scanning light is incident and the plane of incidence becomes a reverse of that in the folding mirror MR1 having the "β+" inclination angle property, as illustrated in FIG. 20 as an example. In this manner, the effect of the birefringence of the scanning lens 11 appearing on the folding mirror MR1 is cancelled out on the folding mirror MR2. As described above, the effect of the uneven birefringence distribution in the scanning lens 11 can be alleviated by configuring the image-plane-side optical system 110 to include the same numbers of the folding mirrors having the "β+" inclination angle property and the folding mirrors having the "β−" inclination angle property, respectively.

Sixth Exemplary Configuration

Figure 21:
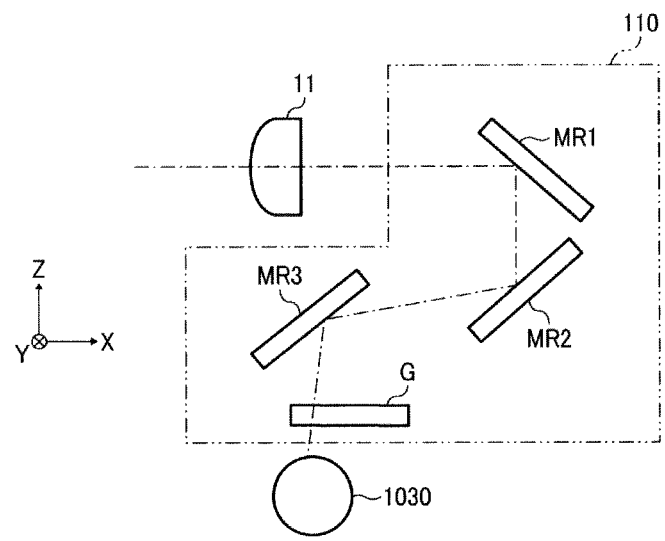
FIG. 21 is a schematic for explaining a sixth exemplary configuration of the image-plane side optical system illustrated in FIG. 2.

In the sixth exemplary configuration, the image-plane-side optical system 110 includes three sheets of folding mirrors (MR1, MR2, and MR3) and a single sheet of sheet glass G, as illustrated in FIG. 21 as an example.

Figure 22:
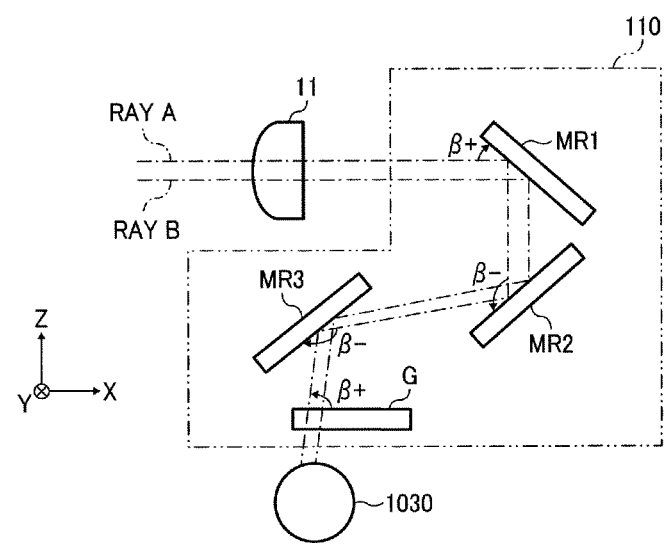
FIG. 22 is a schematic for explaining light paths of chief rays of two scanning light beams in the sixth exemplary configuration.

In this configuration, the inclination angle property of the folding mirror MR1 is "β+", and the inclination angle properties of the folding mirror MR2 and a folding mirror MR3 are "β−" (see FIG. 22).

For convenience, in the light path from the polygon mirror 13 to the photosensitive drum 1030 on the X-Z plane, a sheet glass having a incident surface to which the ray A is incident on a position nearer to the polygon mirror 13 than the ray B is defined as a sheet glass with a "β+" inclination angle property, and a sheet glass with an opposite property is defined as a folding mirror with "β−" inclination angle property, in the same manner as in the folding mirror.

In this example, the sheet glass G has a "β+" inclination angle property (see FIG. 22).

In this example, the total number of the folding mirror having the "β+" inclination angle property and the sheet glass having the "β−" property is one, and the total number of the folding mirrors having the "β−" property and the sheet glass with the "β+" property is three. In this relationship, the cancelling effect of the uneven birefringence distribution of the scanning lens 11, explained earlier in the fifth exemplary configuration, cannot be expected.

Therefore, for example, the folding mirror MR1 should be provided only with an aluminum coating, and the folding mirror MR2, the folding mirror MR3, and the sheet glass G should be coated with a multilayer film as reflection prevention.

In such a case, the multilayer film coated on the folding mirror is preferably satisfies the following formula (6), where the maximum inclination angle thereof with respect to the incident light on the X-Z plane is denoted as βmax, the reflectance of the S polarized component is denoted as Rs(βmax), the reflectance of the P polarized component is denoted as Rp(βmax):

$$0.98 < Rs(\beta max)/Rp(\beta max) < 1.02 \qquad (6)$$

In addition, the multilayer film, coated on the sheet glass, preferably satisfies the following formula (7), where the maximum inclination angle thereof with respect to the incident light on the X-Z plane is denoted as βmax, the transmittance of the S polarized component is denoted as Ts(βmax), the transmittance of the P polarized component is denoted as Tp(βmax):

$$0.98 < Ts(\beta max)/Tp(\beta max) < 1.02 \quad (7)$$

In this manner, the effect of the birefringence of the folding mirror MR2, the folding mirror MR3, and the sheet glass G can be cancelled out on the folding mirror MR1.

In this embodiment, the image-plane-side optical system 110 having the same configuration as any one of the first to the sixth exemplary configurations is used.

As explained above, the optical scanner 1010 according to the embodiment includes the light source 14, the coupling lens 15, the aperture plate 16, the cylindrical lens 17, the polygon mirror 13, the molded plastic scanning lens 11, and the image-plane-side optical system 110.

The image-plane-side optical system 110 includes at least one of a single sheet of a folding mirror or a sheet glass.

The formulas (1) to (4) are established, and the scanning lens 11 has uneven birefringence distribution with respect to the sub-scanning corresponding direction (which is the same as the Z axis direction in this example).

When the image-plane-side optical system 110 does not include any molded plastic scanning lens, the image-plane-side optical system 110 is configured so that the optical conjugate image of the aperture plate 16 is formed between the first surface and the second surface of the scanning lens 11 with respect to the sub-scanning corresponding direction (which is the same as the Z axis direction in this example). In this case, the difference in the amount of light among a plurality of scanning light beams condensed on the surface of the photosensitive drum 1030 can be reduced.

Furthermore, when the image-plane-side optical system 110 includes the molded plastic scanning lens 12 having the uneven birefringence distribution with respect to the sub-scanning corresponding direction (which is the same as the Z axis direction in this example), the image-plane-side optical system 110 is configured so that the optical conjugate image of the aperture plate 16 is formed between the first surface of the scanning lens 11 and the second surface of the scanning lens 12 with respect to the sub-scanning corresponding direction (which is the same as the Z axis direction in this example). In this case, the difference in the amount of light among the scanning light beams condensed on the surface of the photosensitive drum 1030 can be reduced.

If the thickness difference in the scanning lens 11 is larger than that of the scanning lens 12, the image-plane-side optical system 110 is configured so that the optical conjugate image of the aperture plate 16 is formed near the scanning lens 11. In this case, the difference in the amounts of light among the scanning light beams condensed on the surface of the photosensitive drum 1030 can be further reduced.

Furthermore, assuming the number of folding mirrors with the "β+" inclination angle property is m1, the number of folding mirrors with the "β−" inclination angle property is m2, the number of sheet glasses with the "β+" inclination angle property is g1, and the number of sheet glasses with the "β−" inclination angle property is g2, (A) when the total number of the folding mirror(s) and the sheet glass(es) included in the image-plane-side optical system 110 is an even number, the image-plane-side optical system 110 is configured so that m1+g2=m2+g1 is established. In this manner, the effect of the uneven birefringence distribution of the scanning lens 11 can be cancelled out.

(B) When the total number of the folding mirror(s) and the sheet glass(es) included in the image-plane-side optical system 110 is an odd number and m1+g2≠m2+g1, at least one of the sheet glasses is applied with reflection prevention coating. In this manner, the effect of the uneven birefringence distribution of the scanning lens 11 can be reduced.

(C) When the total number of the folding mirror(s) and the sheet glass(es) included in the image-plane-side optical system 110 is an odd number and m1+g2<m2+g1, at least one of the m1 folding mirrors is configured to have a larger reflectance difference between the P polarized light and the S polarized light than any one of the m2 folding mirrors, within a range of expected incident angles. In this manner, the effect of the uneven birefringence distribution of the scanning lens 11 can be cancelled out.

(D) When the total number of the folding mirror(s) and the sheet glass(es) included in the image-plane-side optical system 110 is an odd number and m1+g2>m2+g1, at least one of the m2 folding mirrors is configured to have a larger reflectance difference between the P polarized light and the S polarized light than any one of the m1 folding mirrors, within a range of expected incident angles. In this manner, the effect of the uneven birefringence distribution of the scanning lens 11 can be cancelled out.

Therefore, highly accurate optical scanning can be achieved even when a multi-beam light source and a molded plastic scanning lens are used.

Furthermore, because the lateral magnification of the optical conjugate image of the aperture plate 16 is set to less than one, a plurality of light beams can pass through a narrow area on the molded plastic scanning lens. In this case, the effect of the birefringence in the light beams can be further reduced.

Furthermore, because the light source 14 includes a plurality of light emitters, a plurality of scans can be performed simultaneously, to speed up and to increase the density of image formation.

Furthermore, because the laser printer 1000 according to the embodiment includes the optical scanner 1010, costs can be reduced without compromising image quality.

In the embodiment described above, the light source 14 is explained to include two light emitters; however, the present invention is not limited thereto, and the light source 14 may also include three or more light emitters.

Furthermore, according to the embodiment, six configurations of the image-plane-side optical system 110 are suggested; however, the present invention is not limited thereto.

For example, the image-plane-side optical system 110 may include a plurality of molded plastic scanning lenses. In such a configuration, the image-plane-side optical system 110 should be configured so that the optical conjugate image of the aperture plate 16 is formed between the first surface of the scanning lens 11 and the second surface of the scanning lens arranged at a position nearest to the photosensitive drum 1030 with respect to the sub-scanning corresponding direction.

Alternatively, the image-plane-side optical system 110 may include a plurality of sheet glasses, for example. In such a configuration as well, the image-plane-side optical system 110 should be configured so that the any one of (A) to (D) mentioned above is satisfied to cancel out the effect of the uneven birefringence distribution of the molded plastic scanning lens.

Alternatively, the image-plane-side optical system 110 may include four or more folding mirrors, for example. In such a configuration as well, the image-plane-side optical system 110 should be configured so that the any one of (A) to (D) mentioned above is satisfied to cancel out the effect of the uneven birefringence distribution of the molded plastic scanning lens.

Furthermore, in the embodiments, the image forming apparatus is explained to be the laser printer 1000; however, the present invention is not limited thereto.

For example, the optical scanner 1010 may be used in an image forming apparatus in which a medium (paper, for example) that is colored by means of a laser beam is directly irradiated with a laser beam.

Alternatively, the optical scanner 1010 may be used in an image forming apparatus using a silver salt film as an image carrying body. In such a configuration, a latent image is formed on the silver salt film by means of optical scanning. Such a latent image can be visualized by a process that is equivalent to a developing process in usual silver halide photography. The image can then be transferred onto printing paper by a process that is equivalent to a printing process in the usual silver halide photography. Such an image forming apparatus can be realized as an optical print making apparatus or an optical drawing apparatus for drawing a computed tomography (CT) scan image, for example.

The optical scanner 1010 is also suitable for image forming apparatuses other than a printer, such as a copier, a facsimile, or a multifunction product having all of these functions.

Figure 23:
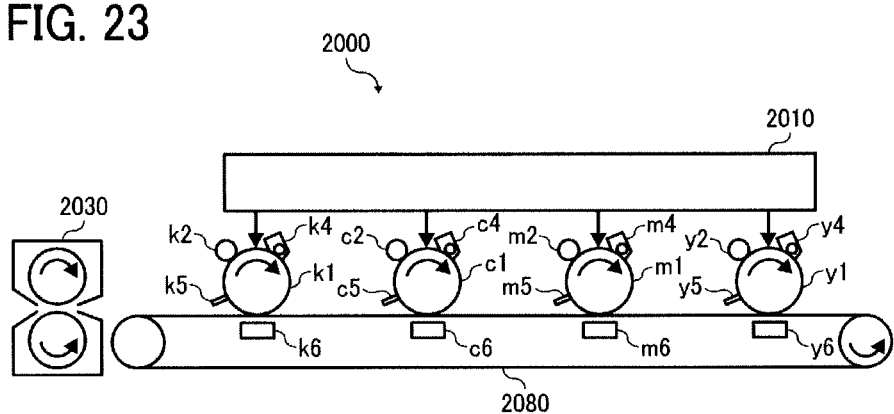
FIG. 23 is a schematic of a color printer.
Figure 24A:
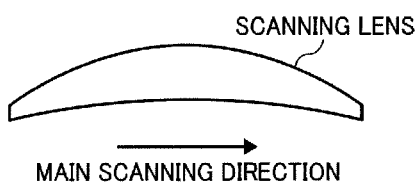
FIG. 24A is a schematic for explaining an example of uneven birefringence in a molded plastic scanning lens.
Figure 24B:
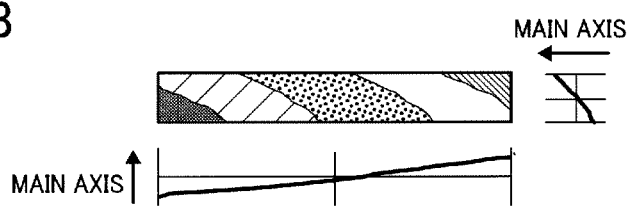
FIG. 24B is another schematic for explaining the example of uneven birefringence in a molded plastic scanning lens.
Figure 24C:
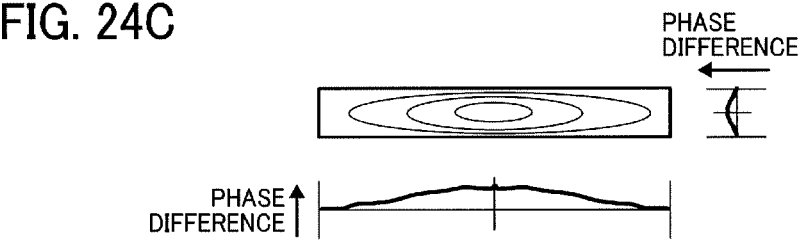
FIG. 24C is another schematic for explaining the example of uneven birefringence in a molded plastic scanning lens.
Figure 25:
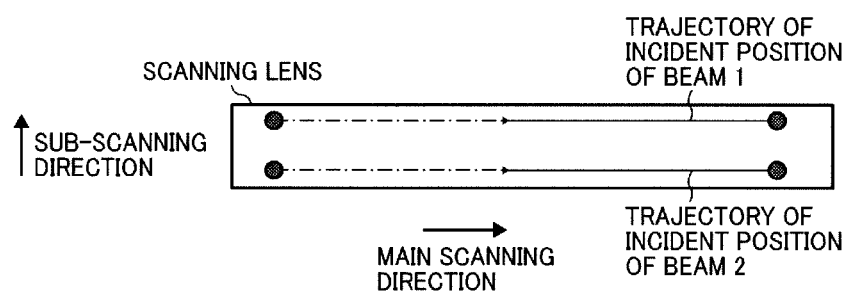
FIG. 25 is a schematic for explaining a beam 1 and a beam 2 incident on the molded plastic scanning lens.
Figure 26:
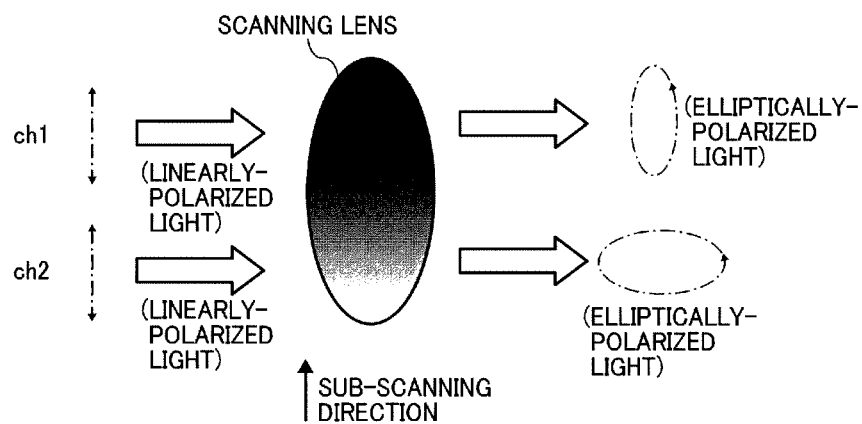
FIG. 26 is a schematic for explaining of polarizations of the beam 1 and the beam 2 after passing through the molded plastic scanning lens.

The image forming apparatus may also be a color printer 2000 having a plurality of photosensitive drums as illustrated in FIG. 23.

The color printer 2000 is a tandem-type multi-color printer that forms a full-color image by superimposing four colors (black, cyan, magenta, and yellow) over one another, and includes: a photosensitive drum k1, a charging unit k2, a developing unit k4, a cleaning unit k5, and a transfer unit k6 for the color black; a photosensitive drum c1, a charging unit c2, a developing unit c4, a cleaning unit c5, and a transfer unit c6 for the color cyan; a photosensitive drum m1, a charging unit m2, a developing unit m4, a cleaning unit m5, and a transfer unit m6 for the color magenta; a photosensitive drum y1, a charging unit y2, a developing unit y4, a cleaning unit y5, and a transfer unit y6 for the color yellow; an optical scanner 2010; a transfer belt 2080; and a fixing unit 2030.

Each of the photosensitive drums is rotated in the direction indicated by the arrow in FIG. 23, and the charging units, the developing units, the transfer units, and the cleaning units are each arranged around the photosensitive drums, sequentially in the direction of rotation of the photosensitive drums.

The charging unit uniformly charges the surface of the corresponding photosensitive drum. Each of the surfaces of the photosensitive drums charged by the charging unit is optically scanned by the optical scanner 2010, and a latent image is formed on each of the photosensitive drums.

A toner image is then formed on the surface of each of the photosensitive drums by means of the corresponding developing unit. The transfer units sequentially transfer the toner image of each color onto recording paper on the transfer belt 2080, and the fixing unit 2030 finally fixes the image onto the recording paper.

The optical scanner 2010 includes a molded plastic scanning lens that is similar to the scanning lens 11, and an image-plane-side optical system that is similar to the image-plane-side optical system 110, for each of the colors. Therefore, the same effects as in the optical scanner 1010 can be achieved.

Therefore, the color printer 2000 can achieve the same effects as the laser printer 1000.

The optical scanner may also be provided for each of the colors, or for each of the two colors in the color printer 2000.

With a multi-beam light source and a molded plastic scanning lens provided to the optical scanner, optical scanning can be performed highly accurately.

With the image forming apparatus including the optical scanner according to an aspect of the present invention, a cost reduction can be achieved without compromising image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
   a light source including a plurality of light emitters;
   an aperture member that collimates light beams output from the light source;
   a deflector that defects the light beams passing through the aperture member;
   a scanning optical system that condenses the light beams deflected by the deflector onto a surface to be scanned so as to optically scan the surface in a main-scanning direction; and
   a lens placed between the aperture member and the deflector, the lens having refraction power in a sub-scanning direction perpendicular to the main-scanning direction, wherein
   the scanning optical system includes a resin scanning system having at least one resin scanning lens,
   at least one folding mirror or one sheet glass is disposed between a scanning lens nearest to the deflector in the resin scanning system and the scanned surface,
   at least one scanning lens included in the resin scanning system has an uneven birefringence distribution with respect to the sub-scanning direction, and
   the refraction power in the sub-scanning direction of the lens and a length of a light path between the lens and the scanning lens nearest to the deflector in the resin scanning system are configured in combination such that an optical conjugate image of the aperture member is formed between a lens surface nearest to the deflector in the resin scanning system and a lens surface nearest to the scanned surface with respect to the sub-scanning direction.

2. The optical scanner according to claim 1, wherein
   the resin scanning system includes a plurality of scanning lenses, and
   an optical conjugate image of the aperture member is formed between a deflector-side surface and a scanned-surface side of a scanning lens where a thickness difference is largest.

3. The optical scanner according to claim 1, wherein
   a single sheet of sheet glass is disposed between a scanning lens nearest to the deflector in the resin scanning system and the scanned surface, and
   the sheet glass is applied with reflection prevention coating.

4. The optical scanner according to claim 1, wherein
   at least one folding mirror and at least one sheet glass are arranged between a scanning lens nearest to the defector in the resin scanning system and the scanned surface,
   a total number of the folding mirror(s) and the sheet glass (es) is an even number, and
   m1+g2=m2+g1 is satisfied using number m1 of the folding mirrors on which a first ray, included in an incident light beam, is incident on a position nearer to the deflector than a second ray, separated from the first ray in a rotation axis direction of the deflector, on a plane perpendicular to the main-scanning direction; number m2 of the folding mirrors on which the second ray is incident on a position nearer to the deflector than the first ray; number g1 of the sheet glasses on which the first ray is incident on a position nearer to the deflector than the second ray; and number g2 of the sheet glasses on which the second ray is incident on a position nearer to the deflector than the first ray.

5. The optical scanner according to claim 1, wherein
at least one folding mirror and at least one sheet glass are arranged between a scanning lens nearest to the defector in the resin scanning system and the scanned surface,
a total number of the folding mirror(s) and the sheet glass (es) is an odd number, and
m1+g2≠m2+g1 is satisfied using number m1 of the folding mirrors on which a first ray, included in an incident light beam, is incident on a position nearer to the deflector than a second ray, separated from the first ray in a rotation axis direction of the deflector, on a plane perpendicular to the main-scanning direction; number m2 of the folding mirrors on which the second ray is incident on a position nearer to the deflector than the first ray; number g1 of the sheet glasses on which the first ray is incident on a position nearer to the deflector than the second ray; and number g2 of the sheet glasses on which the second ray is incident on a position nearer to the deflector than the first ray, and
the sheet glass is applied with reflection prevention coating.

6. The optical scanner according to claim 1, wherein a lateral magnification of the optical conjugate image of the aperture member is less than one.

7. The optical scanner according to claim 1, wherein the light source including the light emitters is a vertical cavity surface emitting laser array.

8. An optical scanner comprising:
a light source including a plurality of light emitters;
an aperture member that collimates light beams output from the light source and coupled;
a deflector that defects the light beams passing through the aperture member; and
a scanning optical system that condenses the light beams deflected on the deflector onto a surface to be scanned so as to optically scan the surface in a main-scanning direction, wherein
the scanning optical system includes a resin scanning system having at least one resin scanning lens,
at least one folding mirror or one sheet glass is disposed between a scanning lens nearest to the deflector in the resin scanning system and the scanned surface,
at least one folding mirror and at least one sheet glass are arranged between a scanning lens located nearest to the defector in the resin scanning system and the scanned surface,
a total number of the folding mirror(s) and the sheet glass (es) is an odd number, and
m1+g2<m2+g1 is satisfied using number m1 of the folding mirrors on which a first ray, included in an incident light beam, is incident on a position nearer to the deflector than a second ray, separated from the first ray in a rotation axis direction of the deflector, on a plane perpendicular to the main-scanning direction; number m2 of the folding mirrors on which the second ray is incident on a position nearer to the deflector than the first ray; number g1 of the sheet glasses on which the first ray is incident on a position nearer to the deflector than the second ray; and number g2 of the sheet glasses on which the second ray is incident on a position nearer to the deflector than the first ray, and
at least one folding mirror in the m1 folding mirrors has a greater reflectance difference between P polarized light and S polarized light than any one of the m2 folding mirrors, within a range of expected incident angles.

9. The optical scanner according to claim 8, wherein
at least one scanning lens included in the resin scanning system has an uneven birefringence distribution with respect to a sub-scanning direction perpendicular to the main-scanning direction, and
an optical conjugate image of the aperture member is formed between a lens surface nearest to the deflector in the resin scanning system and a lens surface nearest to the scanned surface with respect to the sub-scanning direction.

10. An optical scanner comprising:
a light source including a plurality of light emitters;
an aperture member that collimates light beams output from the light source and coupled;
a deflector that defects the light beams passing through the aperture member; and
a scanning optical system that condenses the light beams deflected on the deflector onto a surface to be scanned so as to optically scan the surface in a main-scanning direction, wherein
the scanning optical system includes a resin scanning system having at least one resin scanning lens,
at least one folding mirror or one sheet glass is disposed between a scanning lens nearest to the deflector in the resin scanning system and the scanned surface,
at least one folding mirror and at least one sheet glass are arranged between a scanning lens located nearest to the defector in the resin scanning system and the scanned surface,
a total number of the folding mirror(s) and the sheet glass (es) is an odd number, and
m1+g2>m2+g1 is satisfied using number m1 of the folding mirrors on which a first ray, included in an incident light beam, is incident on a position nearer to the deflector than a second ray, separated from the first ray in a rotation axis direction of the deflector, on a plane perpendicular to the main-scanning direction; number m2 of the folding mirrors on which the second ray is incident on a position nearer to the deflector than the first ray; number g1 of the sheet glasses on which the first ray is incident on a position nearer to the deflector than the second ray; and number g2 of the sheet glasses on which the second ray is incident on a position nearer to the deflector than the first ray, and
at least one folding mirror in the m2 folding mirrors has a greater reflectance difference between P polarized light and S polarized light than any one of the m1 folding mirrors, within a range of expected incident angles.

11. The optical scanner according to claim 10, wherein
at least one scanning lens included in the resin scanning system has an uneven birefringence distribution with respect to a sub-scanning direction perpendicular to the main-scanning direction, and
an optical conjugate image of the aperture member is formed between a lens surface nearest to the deflector in the resin scanning system and a lens surface nearest to the scanned surface with respect to the sub-scanning direction.

12. An image forming apparatus comprising:
at least one image carrying body; and
at least one optical scanner that scans the image carrying body by using a light beam including image information, the optical scanner comprising
  a light source including a plurality of light emitters,
  an aperture member that collimates light beams output from the light source,
  a deflector that defects the light beams passing through the aperture member,
  a scanning optical system that condenses the light beams deflected by the deflector onto a surface to be scanned so as to optically scan the surface in a main-scanning direction, and
  a lens placed between the aperture member and the deflector, the lens having refraction power in a sub-scanning direction perpendicular to the main-scanning direction, wherein
the scanning optical system includes a resin scanning system having at least one resin scanning lens,
at least one folding mirror or one sheet glass is disposed between a scanning lens nearest to the deflector in the resin scanning system and the scanned surface,
at least one scanning lens included in the resin scanning system has an uneven birefringence distribution with respect to the sub-scanning direction, and
the refraction power in the sub-scanning direction of the lens and a length of a light path between the lens and the scanning lens nearest to the deflector in the resin scanning system are configured in combination such that an optical conjugate image of the aperture member is formed between a lens surface nearest to the deflector in the resin scanning system and a lens surface nearest to the scanned surface with respect to the sub-scanning direction.

13. The image forming apparatus according to claim 12, wherein the image information is multi-color image information.

* * * * *